(12) United States Patent
Ling et al.

(10) Patent No.: US 12,013,146 B2
(45) Date of Patent: Jun. 18, 2024

(54) PHASE CHANGE COLD STORAGE DEVICE HAVING VORTEX COILED TUBES

(71) Applicant: NANJING TECH UNIVERSITY, Jiangsu (CN)

(72) Inventors: Xiang Ling, Jiangsu (CN); Zhen Zhang, Jiangsu (CN)

(73) Assignee: NANJING TECH UNIVERSITY, Jiangsu (CN)

( * ) Notice: Subject to any disclaimer, the term of this patent is extended or adjusted under 35 U.S.C. 154(b) by 224 days.

(21) Appl. No.: 17/790,304

(22) PCT Filed: Jul. 3, 2020

(86) PCT No.: PCT/CN2020/100022
§ 371 (c)(1),
(2) Date: Jun. 30, 2022

(87) PCT Pub. No.: WO2021/139121
PCT Pub. Date: Jul. 15, 2021

(65) Prior Publication Data
US 2023/0040985 A1 Feb. 9, 2023

(30) Foreign Application Priority Data
Jan. 7, 2020 (CN) .......................... 202010013867.6

(51) Int. Cl.
*F28D 7/04* (2006.01)
*F24F 5/00* (2006.01)
(Continued)

(52) U.S. Cl.
CPC .............. *F24F 5/0021* (2013.01); *F28D 7/04* (2013.01); *F28D 7/12* (2013.01); *F28D 20/021* (2013.01);
(Continued)

(58) Field of Classification Search
CPC .. F24F 5/0021; F28D 7/04; F28D 7/12; F28D 20/021; F28F 1/24; F28F 1/34; F28F 9/0135; F28F 9/24
See application file for complete search history.

(56) References Cited

U.S. PATENT DOCUMENTS 9,784,459 B2 * 10/2017 Langheinz ................ F25C 1/00
11,287,190 B2 * 3/2022 Kato ......................... F28D 7/04
(Continued)

FOREIGN PATENT DOCUMENTS

CN           1275016 C    *  9/2006
CN          113776373 A   * 12/2021
(Continued)

*Primary Examiner* — Jon T. Schermerhorn, Jr.
(74) *Attorney, Agent, or Firm* — Muncy, Geissler, Olds & Lowe, P.C.

(57) ABSTRACT

The present invention provides a phase change cold storage device having vortex coiled tubes, which falls within the technical field of low temperatures and comprises an inlet tube, an outlet tube, a tube plate, a baffle plate, vortex coiled tubes, a cylinder body, a central tube, a support frame, a seal head and a saddle, wherein the tube plate is fixedly connected to the cylinder body, a lower end position and a central position of the tube plate are respectively perforated, the inlet tube and the outlet tube are respectively connected to a lower end position and a central position of the tube plate, the baffle plate and the vortex coiled tubes are mounted on the central tube, one end of the central tube is fixed on the tube plate, and the other end is inserted through the support frame connected to the cylinder body, the head is connected to the cylinder, provided on the opposite side of the inlet and outlet tubes, and the saddle is provided below the cylinder. The present invention has a compact structure, is easy to manufacture, and easily enhances heat transfer with vortex coiled tubes, and at the same time, has a good cold storage effect and a wide application range.

9 Claims, 2 Drawing Sheets

(51) Int. Cl.
    *F28D 7/12*      (2006.01)
    *F28D 20/02*     (2006.01)
    *F28F 1/24*      (2006.01)
    *F28F 1/34*      (2006.01)
    *F28F 9/013*     (2006.01)
    *F28F 9/24*      (2006.01)
    *F28F 21/08*     (2006.01)

(52) U.S. Cl.
    CPC .................. *F28F 1/24* (2013.01); *F28F 1/34* (2013.01); *F28F 9/0135* (2013.01); *F28F 9/24* (2013.01); *F28F 21/083* (2013.01); *F28F 21/084* (2013.01); *F28F 21/085* (2013.01)

(56) References Cited

U.S. PATENT DOCUMENTS

| | | | | |
|---|---|---|---|---|
| 2017/0248377 A1* | 8/2017 | De Falco | .............. | F28D 20/028 |
| 2020/0217522 A1* | 7/2020 | Roady | .................... | F28F 1/122 |
| 2023/0020370 A1* | 1/2023 | Enomura | .................. | F28D 7/02 |
| 2023/0330616 A1* | 10/2023 | Oud | ....................... | C10G 9/002 |

FOREIGN PATENT DOCUMENTS

| | | | | | |
|---|---|---|---|---|---|
| EP | 3193117 B1 | * | 2/2019 | ........... | F28D 20/021 |
| JP | 2019521308 A | * | 7/2017 | | |

\* cited by examiner

PHASE CHANGE COLD STORAGE DEVICE HAVING VORTEX COILED TUBES

TECHNICAL FIELD

The present invention is in the field of cryogenic technology and is applicable to public buildings, air conditioning and cold storage, refrigerated transport and the like, and more particularly to a cryogenic fluid cold energy storage device.

BACKGROUND ART

With the rapid development of industrialization, energy problems have gradually become a key factor restricting economic development, thus how to store energy efficiently has become a key problem in the industry. Cold storage technology is to store sensible heat or latent heat released by the change of working medium state, so as to overcome the contradiction of uneven distribution of energy in time and space, which has been widely used in various fields of the national economy.

At present, most of the existing cold storage devices are mainly ice-cold storage and water energy storage devices. These devices have great limitations, such as complex system, large footprint, short life, low efficiency and poor economic benefits. The device stores something in cold using the latent heat of phase change of materials, which has the advantages of high energy storage density, constant temperature and high thermal efficiency. At the same time, because the energy storage density of phase change material is significantly higher than that of water sensible heat storage system, the device has a compact structure and small heat loss, so it has a great application prospect.

SUMMARY OF THE INVENTION

The present invention has been made in view of the above-mentioned deficiencies in the background art, and provides a phase change cold storage device having vortex coiled tubes, which is highly efficient and reliable, and has the following advantages under the influence of the baffle plate, when the cryogenic fluid flows in the shell side, the flow direction changes periodically along the axial direction, which increases the degree of turbulence and improves the heat transfer coefficient. At the same time, the phase change material is stored in vortex coiled tubes which are of a compact structure, which has the characteristics of large filling capacity. The special vortex structure will also cause the secondary flow of the internal fluid, and enhance the heat exchange between the internal fluid and the tube wall. In addition, phase change materials have a wide range of sources, with a larger latent heat of phase change, better thermal and chemical stability, environmental-friendly, safe and reliable, and can be reused many times.

In order to solve the above technical problem, the present invention is realized by the following technical solutions: a phase change cold storage device having vortex coiled tubes comprising an inlet tube, an outlet tube, tube plates, baffle plates, vortex coiled tubes, a cylinder body, a central tube, a support frame, a seal head and a saddle, wherein the tube plates are fixedly connected to the cylinder body, a lower end position and a central position of the tube plate are respectively perforated, the inlet tube and the outlet tube are respectively connected to a lower end position and a central position of the tube plates, the baffle plate and the vortex coiled tube are mounted on the central tube, one end of the central tube is fixed on the tube plate, and the other end is inserted through the support frame connected to the cylinder body, the head is connected to the cylinder, provided on the opposite side of the inlet and outlet tubes, and the saddle is provided below the cylinder.

Several vortex coiled tubes are mounted between the baffle plates, and the number thereof can be determined according to the actual cold storage amount; baffle plates can change the flow direction of cryogenic fluid in the shell side and enhance heat transfer; the baffle plate has a central opening, and the whole is in an arcuate shape or a disc-annular shape; the spacing of the baffle plates may be determined by the nature of the medium, the flow rate and the size of the device, and is generally not less than one fifth of the length of the cylinder, and the size of the central opening is determined by the diameter of the central tube.

The central tube may be of a single-tube or a double-tube structure; when the central tube is of a double-tube structure, the central tube mainly comprises an outer tube, an inner tube, an annular tube plate and fins nested between the inner tube and the outer tube; the inner tube and the outer tube are filled with a phase change material therebetween.

The fins may be a circular fin, a spiral fin, a corrugated fin, a needle-shaped fin, etc.

The support frame is composed of a sleeve and support rib plates, and the number of rib plates can be determined according to actual circumstance, and the diameter of the sleeve is slightly greater than the diameter of the central tube.

The vortex coiled tube is comprised of backing strips, backing rings, support rings, substrate backing strips, and coiled tubes.

Preferably, the outer diameter of the coiled tubes can be 19 mm, 25 mm, 32 mm and other common heat exchange tube sizes.

The backing rings are spot-welded between the coiled tube rings, and the thickness of the backing rings can be determined according to actual circumstance, and is generally 1-5 mm.

The inner rings of the coiled tubes are uniformly fixed by backing rings and are spot-welded on the support rings, and then the backing rings are welded one by one in a radial direction on the basis of the inner rings; after the coil has been wound for several turns, backing strips are added evenly circumferentially between the rings and as an added substrate, the backing rings are continuously welded since the next turn, and the backing rings are eventually distributed radially along the plane in incremental steps.

The position and number of the initial addition of the backing strips can be determined according to the overall size of the vortex coiled tube; the backing strips are flat and have a thickness consistent with that of the backing rings.

The inner diameter of the support rings is the same as the outer diameter of the central tubes; the support rings have the same thickness as that of the backing rings and a length slightly greater than the outer diameter of the coiled tubes.

Spacer substrate backing strips are required at the gap between the support rings and the inner rings of the coiled tubes, the thickness of the substrate backing strips is determined in combination with the outer diameter of the coiled tubes.

The phase change material in the coiled tubes is selected according to the temperature range of the application and may be an organic or inorganic phase change material or a composite phase change material.

Preferably, the phase change material in the coiled tubes is mainly an organic phase change material such as octanoic acid, nonanoic acid, decanoic acid, dodecanol, tert-pentanol, ethylene glycol, n-dodecane, n-tetradecane, n-pentadecane, n-hexadecane, or an inorganic phase change material such as NaSO·HO, GeSbTe, or a composite phase change material composed of two or more materials.

The fluid in the shell side is a cryogenic fluid having an inlet temperature below the phase change temperature of the phase change material in the coiled tubes.

Preferably, the cryogenic fluid medium may be ammonia, methane, nitrogen, or the like.

The outer wall of the cylinder body is wrapped with an insulation layer of insulation material.

The tube material of the coiled tubes and the plate material of the baffle plates may be non-uniform, ranging from carbon steel, stainless steel, steel and steel alloys, aluminum and aluminum alloys, copper and copper alloys, and other specialty metals.

The present invention has the following advantages over the prior art:

1. compared with other heat-storage media, latent heat-storage phase change materials have higher heat-storage density, appropriate heat-storage temperature and good adaptability to the change of cooling load. In the same temperature range, its storage capacity is larger than the sensible heat of water. Compared with ice storage, it has the advantages of maintaining fluidity. At the same time, phase change materials have a wide range of sources, good thermal and chemical stability, safe and reliable, and can be reused many times.

2. Compared with the conventional circular pipe, the vortex coiled tubes are compact in structure and easy to mount. Its filling capacity is large and its heat exchange area is large. The special structure of vortex coiled tubes will generate a secondary flow inside, thus strengthening the heat exchange between the fluid in the tube and the tube wall and improving the utilization rate of cold energy.

3. The device is simple in structure and easy to manufacture. The central tube is inserted on the support frame on a side close to the seal head, and is a detachable structure, so that the central tube can be easily inserted into or withdrawn from the housing. At the same time, when the temperature difference between the phase change material and the cryogenic fluid is large, the central tube can expand and contract freely along the axial direction, which completely eliminates the thermal stress.

4. A baffle plate is provided in the device, which can control the flow direction of the fluid, make the fluid flow along the axial direction continuously changing, and can further increase the degree of turbulence and improve the heat transfer coefficient.

5. It can be mounted in units of coiled tube units, which is convenient for mounting. At the same time, the required number of coiled tubes can be increased or decreased according to the actual demand for cold storage, with a wide range of applications.

6. A wide range of tube materials and plate materials are available, including carbon steel, stainless steel, steel and steel alloys, aluminum and aluminum alloys, copper and copper alloys, and other specialty metals.

7. The heat exchange time between the cryogenic fluid and the phase change material in the heat storage device is greatly extended by entering the cryogenic fluid from the inlet tube, moving in an axial direction, refluxing through the central tube near the orifice on the head side, and being finally discharged from the outlet tube.

8. Welding between the coils of the coiled tubes is backing ring welding, on the one hand, the coils can be integrally fixed, and on the other hand, the spacing between adjacent coils can be controlled by adjusting the thickness of the backing rings.

In the figure: 1—inlet tube; 2—outlet tube; 3—tube plate; 4—baffle plate; 5—vortex coiled tubes; 6—cylinder body; 7—central tube; 8—support frame; 9—seal head; 10—saddle; 11—outer tube; 12—inner tube; 13—annular tube plate; 14—fins; 15—sleeve; 16—rib plates; 17—backing strips; 18—backing rings; 19—support rings; 20—substrate backing strips; 21—coiled tubes.

DETAILED DESCRIPTION OF THE INVENTION

The technical solutions in the embodiments of the present invention will be clearly and completely described with reference to the accompanying drawings in the embodiments of the present invention. The drawings are simplified schematic diagrams illustrating the basic structure of the invention in a schematic way only.

Figure 1:
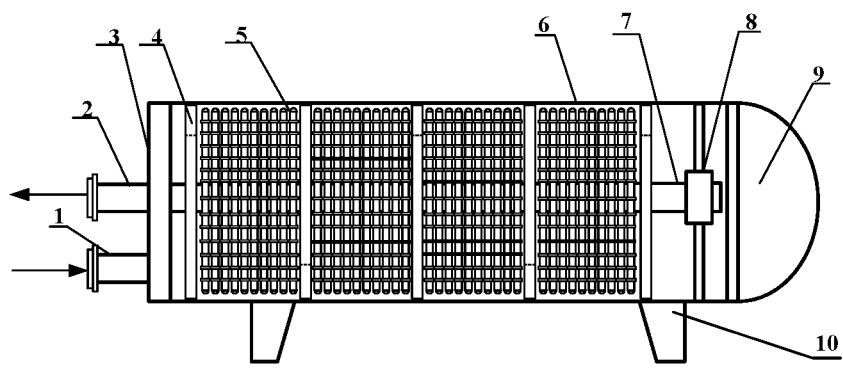
FIG. 1 is a schematic plan view of a phase change cold storage device having vortex coiled tubes according to the present invention.
Figure 2:
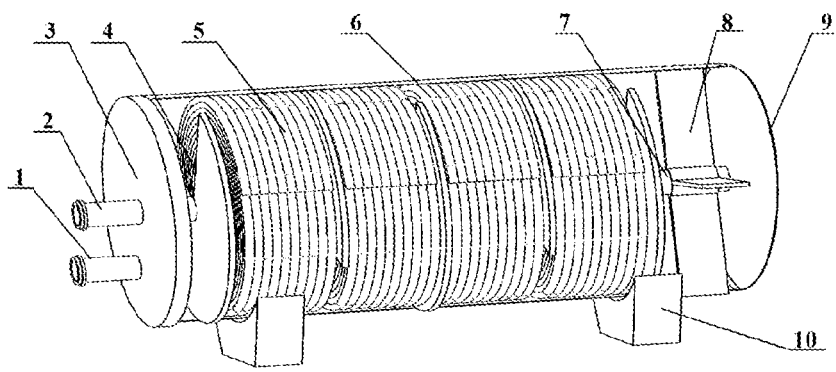
FIG. 2 is a schematic perspective view of a phase change cold storage device having vortex coiled tubes according to the present invention.
Figure 3:
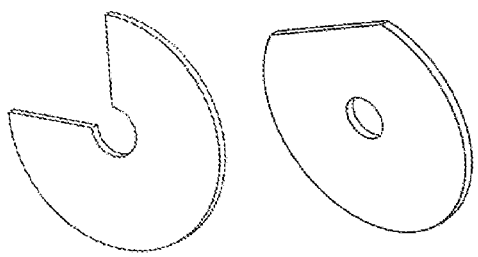
FIG. 3 is a schematic view showing the configuration of a baffle plate in the phase change cold storage device having vortex coiled tubes according to the present invention.

As shown in FIGS. 1 and 2, the phase change cold storage device having vortex coiled tubes of the present embodiment comprises an inlet tube 1, an outlet tube 2, a tube plate 3, a cylinder 6, a central tube 7, a support frame 8, a seal head 9, a saddle 10, a baffle plate 4 and a vortex coiled tube 5 mounted on the central tube 7; several vortex coiled tubes 5 are mounted between the baffle plates 4, and the number thereof can be determined according to the actual cold storage capacity; the baffle plate 4 can change the flow direction of the cryogenic fluid in the shell side and enhance heat transfer; the tube plate 3 is welded to the cylinder body 6, and a lower end position and a central position of the tube plate 3 are respectively perforated, and the inlet tube 1 and the outlet tube 2 are welded for the inlet and outlet of the cryogenic fluid; the cryogenic fluid medium can be methane, ammonia gas, nitrogen gas, etc. and the inlet temperature thereof is lower than the phase change temperature of the phase change material in the coil 21; one end of the central tube 7 is fixed on the tube plate 3, and the other end is inserted on a support frame 8 welded with the cylinder body 6; the central tube 7 can be a single-tube or a double-tube structure;

As shown in FIG. 3, the baffle plate 4 has a central opening, and the whole is in an arcuate shape or a disc-annular shape; the spacing of the baffle plates 4 can be determined according to the properties of the medium, the flow rate and the size of the device, and is generally not less than one fifth of the length of the cylinder, and the size of the central opening can be determined according to the diameter of the central tube 7; the outer wall of the cylinder body 6 is wrapped with an insulation layer of insulation material.

Figure 4:
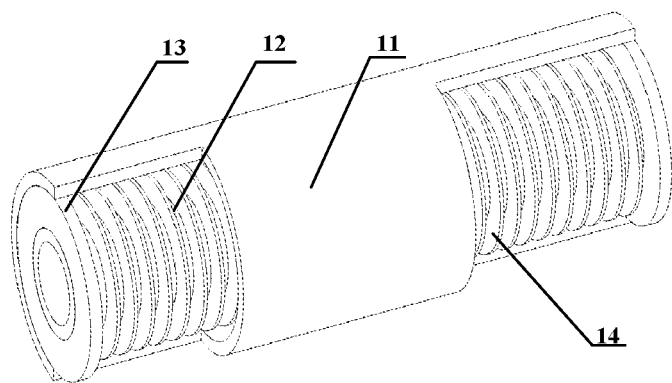
FIG. 4 is a schematic view showing that the central tube of the phase change cold storage device having vortex coiled tubes has a double-tube structure according to the present invention.
Figure 5:
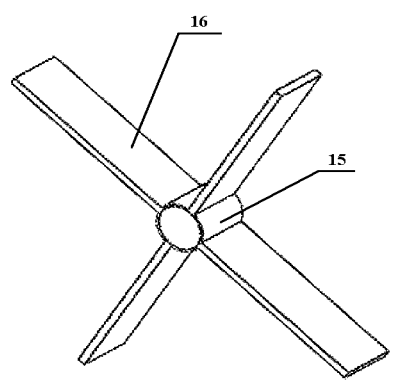
FIG. 5 is a schematic view showing the structure of a support frame of the phase change cold storage device having vortex coiled tubes according to the present invention.

As shown in FIG. 4, when the central tube 7 is of a double-tube structure, the central tube 7 mainly comprises an outer tube 11, an inner tube 12, an annular tube plate 13 and fins 14 nested between the inner tube 12 and the outer tube 11; the phase change material is filled between the inner tube 12 and the outer tube 11, and the fins 14 can be circular fins, spiral fins, corrugated fins, needle-shaped fins, etc.; the cryogenic fluid refluxes through the central tube 7, which greatly increases the heat exchange time with the phase change material in the heat storage device and improves the heat exchange efficiency;

as shown in FIG. 5, the support frame 8 is composed of a sleeve 15 and support ribs 16, and the number of ribs 16 can be determined according to actual circumstance, and the diameter of the sleeve 15 is slightly greater than the diameter of the central tube 7; a support rib plate 16 is welded on the cylinder body 6 for supporting the central tube 7; a side of the central tube 7 close to the seal head 9 is sleeved on the sleeve 15 and is of a detachable structure, so that the central tube can be easily inserted into or withdrawn from the housing, and at the same time, when the temperature difference between the phase change material and the cryogenic fluid is large, the central tube 7 can freely expand and contract in the axial direction, completely eliminating the temperature difference stress.

Figure 6:
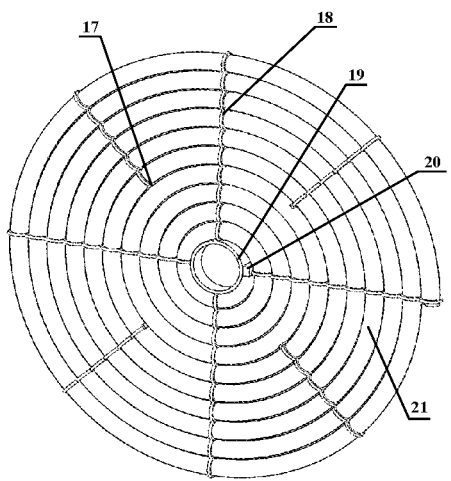
FIG. 6 is a schematic view showing the structure of the vortex coiled tube of the phase change cold storage device having vortex coiled tubes according to the present invention.
Figure 7:
FIG. 7 is a schematic view of the backing rings of the phase change cold storage device having vortex coiled tubes according to the present invention.

As shown in FIGS. 6 and 7, the vortex coiled tubes 5 are composed of backing strips 17, backing rings 18, support rings 19, substrate backing strips 20, and coils 21. The outer diameter of the coiled tube 21 can be Φ19 mm, Φ25 mm, Φ32 mm and other common heat exchange tube sizes; the two ends of the coil tube 21 are closed, and a phase change material is contained inside; the phase change material can be selected according to the temperature range of the application, and is mainly an organic phase change material such as octanoic acid, nonanoic acid, decanoic acid, dodecanol, tert-pentanol, ethylene glycol, n-dodecane, n-tetradecane, n-pentadecane and n-hexadecane, or an inorganic phase change material such as $Na_2SO_4 \cdot 10H_2O$, $Ge_1Sb_2Te_4$, etc., can also be a composite phase change material composed of two or more materials; the phase change materials have high storage density, suitable storage temperature, good adaptability to the change of cooling load, wide sources, good thermal stability and chemical stability, safe and reliable, and can be reused for many times; backing rings 18 are welded between the coils 21, and the thickness of the backing rings 18 can be determined according to actual circumstance, and is generally 1-5 mm; The inner rings of the coil tubes 21 are uniformly fixed by four backing rings 18 and are spot-welded on the support ring 19, and then the backing rings 18 are welded one by one in a radial direction on the basis thereof; when the coil tubes 21 are wound for several times, backing strips 17 are uniformly added between the backing rings 18 and serve as an increased base, and the backing rings 18 are continuously spot-welded since the next winding, and the backing rings 18 are finally distributed along the plane in a gradually increasing radial pattern; the position and number of the addition of the backing strips 17 can be determined according to the overall size of the vortex coiled tubes 5; the backing strips 17 are flat and have a thickness consistent with that of the backing rings 18; the inner diameter of the support rings 19 is the same as the outer diameter of the central tube 7, the thickness thereof is consistent with that of the backing rings 18, and the length thereof is slightly greater than the outer diameter of the coiled tubes 21; the gap between the support rings 19 and the inner ring of the coiled tubes 21 needs to be lined with substrate backing strips 20, and the thickness of the substrate backing strips 20 needs to be determined in combination with the outer diameter of the coiled tubes 21; tube materials and plate materials may vary, ranging from carbon steel, stainless steel, steel and steel alloys, aluminum and aluminum alloys, copper and copper alloys, and other specialty metals.

The phase change cold storage device having vortex coiled tubes provided by the present invention has a compact structure, high efficiency and reliability, and has a wide application range. When the cryogenic fluid flows in the shell side, the fluid will change direction periodically due to the influence of the baffle plate, which will increase the degree of turbulence and improve the heat transfer coefficient. At the same time, on the one hand, the special structure of the vortex coiled tubes can increase the filling amount of the phase change material, and on the other hand, the secondary flow of the internal fluid will be generated to enhance the heat exchange between the internal fluid and the tube wall. In addition, the return of the cryogenic fluid through the central tube greatly increases the heat exchange time with the phase change material in the heat storage device and increases the heat exchange efficiency.

While the present invention has been described in connection with what is presently considered to be the preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A phase change cold storage device having vortex coiled tubes, comprising: an inlet tube (1), an outlet tube (2), a tube plate (3), a baffle plate (4), vortex coiled tubes (5), a cylinder body (6), a central tube (7), a support frame (8), a seal head (9) and a saddle (10), wherein the tube plate (3) is fixedly connected to the cylinder body (6), a lower end position and a central position of the tube plate (3) are respectively opened, the inlet tube (1) and the outlet tube (2) are respectively connected to the lower end position and the central position of the tube plate (3), and the baffle plate (4) and the vortex coiled tubes (5) are mounted on the central tube (7), one end of the central tube (7) is fixed on the tube plate (3), and the other end is inserted on the support frame (8) connected to the cylinder body (6); the seal head (9) is connected to the cylinder body (6) and arranged on the other side opposite to the inlet tube (1) and the outlet tube (2); and the saddle (10) is arranged below the cylinder body (6), wherein the support frame (8) is composed of a sleeve (15) and a support rib plate (16), and the diameter of the sleeve (15) is slightly larger than the diameter of the central tube (7).

2. The phase change cold storage device having vortex coiled tubes according to claim 1, wherein there are N baffle plates (4) (N>2), and M vortex coiled tubes (5) are mounted between every two baffle plates (4) (M>4); the baffle plate (4) has a central opening, and the whole is in an arcuate shape or a disc-annular shape; the size of the central opening is adapted to the diameter of the central tube (7).

3. The phase change cold storage device having vortex coiled tubes according to claim 1, wherein the vortex coiled tube (5) comprises backing strips (17), backing rings (18), a support ring (19) and coiled tubes (21); the backing rings (18) are welded between rings of the coiled tubes (21); four backing rings (18) are uniformly distributed and fixedly arranged on the inner rings of the coiled tubes (21) and are spot-welded on the support rings (19); the backing strips (17) are uniformly distributed along the circumference between the backing rings (18); the backing rings (18) are finally distributed along a plane in a stepwise increasing radial manner; and the thickness of the backing rings (18) is 1-5 mm.

4. The phase change cold storage device having vortex coiled tubes according to claim 3, wherein the two ends of the coiled tube (21) are closed, and a phase change material is contained inside; the support rings (19) are lined with substrate backing strips (20) at a gap between the inner rings of the coiled tubes (21), and the thickness of the substrate backing strips (20) is adapted to the outer diameter of the coiled tubes (21); the backing strips (17) are flat, and the inner diameter of the support ring (19) is the same as the outer diameter of the central tube (7); the support rings (19) have the same thickness as the backing strips (17) and backing rings (18) and a length slightly greater than the outer diameter of the coiled tubes (21).

5. The phase change cold storage device having vortex coiled tubes according to claim 1, wherein the central tubes (7) are of a single-tube or double-tube structure; the central tube (7) comprises an outer tube (11), an inner tube (12), an annular tube plate (13) and fins (14) nested between the inner tube (12) and the outer tube (11); and the inner tube (12) and the outer tube (11) are filled with a phase change material therebetween.

6. The phase change cold storage device having vortex coiled tubes according to claim 5, wherein the fins (14) are a circular fin, a spiral fin, a corrugated fin or a needle-shaped fin.

7. The phase change cold storage device having vortex coiled tubes according to claim 1, wherein the outer wall of the cylinder body (6) is wrapped with an insulation layer composed of an insulation material.

8. The phase change cold storage device having vortex coiled tubes according to claim 4, wherein the phase change material in the coiled tubes (21) and the central tube (7) is an organic phase change material, an inorganic phase change material or a composite phase change material; the organic phase change material is octanoic acid, nonanoic acid, decanoic acid, dodecanol, tert-pentanol, ethylene glycol, n-dodecane, n-tetradecane, n-pentadecane or n-hexadecane, and the inorganic phase change material is Na2SO410H20 or Ge1 Sb2Te4.

9. The phase change cold storage device having vortex coiled tubes according to claim 8, wherein the fluid in the device is a cryogenic fluid, the inlet temperature of which is lower than the phase change temperature of the phase change material in the coiled tubes (21) and the central tube (7).

* * * * *